United States Patent Office 3,058,763
Patented Oct. 16, 1962

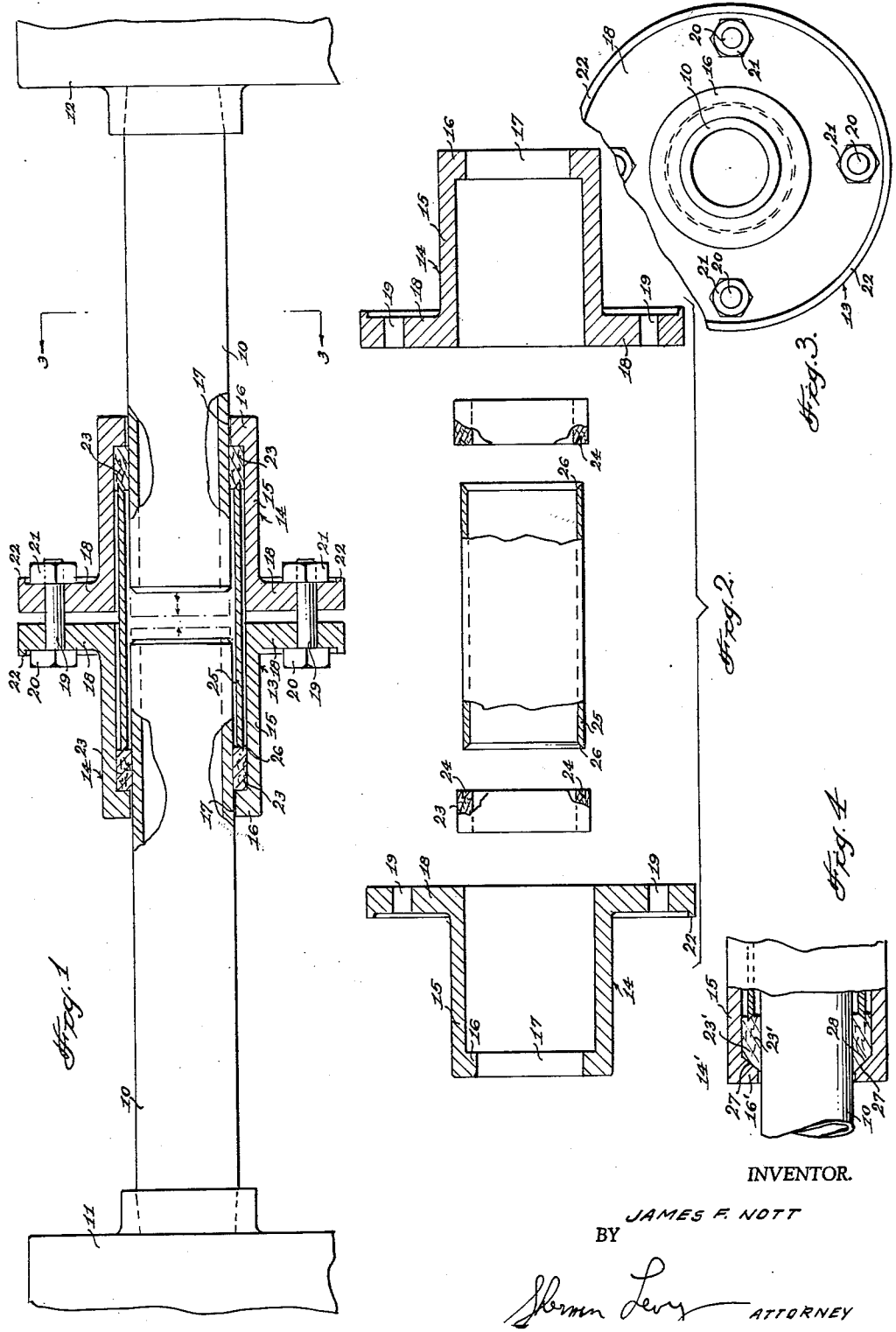

3,058,763
COUPLED PIPE SECTIONS HAVING AXIAL MOVEMENT WITHOUT MISALIGNMENT THEREOF
James Franklin Nott, 1427 Walker Ave., Baltimore 12, Md.
Filed June 24, 1960, Ser. No. 38,589
1 Claim. (Cl. 285—368)

This invention relates to a coupling, and more particularly to a coupling for connecting together adjacent ends of tubular members or pipes.

The object of the invention is to provide a pipe coupling which is adapted to be used for conveniently and readily fastening together the adjacent or meeting ends of pipes and wherein the coupling of the present invention will eliminate the necessity of welding the pipes together, and wherein the coupling can be used on pipes having different types of fluid or gaseous substance passing therethrough such as water, steam or the like.

Another object of the invention is to provide a pipe coupling which includes a pair of members which can be readily fastened together by means of securing elements and wherein with the couping mounted on adjacent ends of pipes, leakage of the material which is passed through the pipes will be eliminated or prevented.

A further object of the invention is to provide a pipe coupling which is extremely simple and inexpensive to manufacture.

Other objects and advantages will be apparent during the course of the following description.

In the accompanying drawings, forming a part of this application, and in which like numerals are used to designate like parts throughout the same FIG. 1 is an elevational view illustrating the pipe coupling of the present invention being used, and with parts broken away and in section.

FIG. 2 is a fragmentary sectional view, illustrating the pipe coupling of the present invention, with the parts separated.

FIG. 3 is a sectional view taken generally on the line 3—3 of FIG. 1.

FIG. 4 is a fragmentary sectional view illustrating a modification.

Referring in detail to the drawings, and more particularly to FIGS. 1, 2 and 3 of the drawings, the numeral 10 indicates each of a pair of pipes which are arranged in end to end relation with respect to each other, and these pipes 10 may be connected to members or structures such as the structures 11 and 12. According to the present invention there is provided a pipe coupling which is indicated generally by the numeral 13, and the pipe coupling 13 embodies or comprises a pair of similar body members 14, and each body member 14 includes a cylindrical portion 15 which is provided with an inwardly directed circular shoulder 16 over one end thereof, and the shoulder 16 has defined therein an opening or circular cutout 17 for the projection therethrough of a portion of a corresponding pipe 10, FIG. 1.

Each body member 14 further includes on an end thereof an outwardly directed flange 18 of circular formation, and the flange 18 is provided with a plurality of spaced apart circular openings or apertures 19. The numerals 20 indicate securing elements or bolts which have their shanks extending through the apertures 19, and fasteners such as the nuts 21 are adapted to be arranged in threaded engagement with the bolts 20 so as to maintain the pair of body members 14 clamped together. The flanges 18 are also provided with circular ribs or ridges 22 adjacent their outer periphery.

As shown in the drawings, there is further provided a tubular sleeve 25 which surrounds the adjacent end portions of the pipes 10, and the ends of the sleeve 25 are tapered or beveled as indicated by the numeral 26. Compressible rings 23 are seated within the body members 14, and these rings 23 abut the shoulders 16. The rings 23 are provided with circular grooves 24 which snugly receive therein the beveled end portions 26 of the sleeves 25. The opening 17 may be of a size which is slightly larger than the outside diameter of the pipe 10 so as to permit slight expansion and contraction of the parts as, for example, when steam or other hot or cold substances are passing through the pipes. The sleeve 25 is also slightly larger in diameter than the outside diameter of the pipes 10, but the sleeve 25 is of slightly less diameter than the diameter of the portions 15. The compressible rings 23 are of a size so as to snugly engage the outer surface of the pipes 10 in order to prevent any leakage of material through the coupling from the pipe joint.

Referring now to FIG. 4 of the drawings there is illustrated a modification wherein the numeral 23' indicates a modified compressible ring which is adapted to be used instead of or in lieu of the ring 23, and the ring 23' has a tapered end portion 28 for snugly engaging the tapered or beveled inner surface 27 on the shoulder 16' of the body member 14'.

From the foregoing, it is apparent that there has been provided a coupling which is especially suitable for use in connecting pipes, such as the pipes 10 together. The coupling 13 of the present invention can be used for connecting adjacent or meeting ends of pipes together, and in addition the coupling can be used as a repair unit as, for example, when sections of pipes, hoses or the like are to be clamped or fastened together, as, for example, when such members have become separated or detached for any reason.

With the parts arranged as shown in the drawings, and according to the present invention, it will be seen that one of the body members 14 is adapted to be arranged on an end portion of each pipe 10, and the compressible rings 23 which may be made of a suitable yieldable or resilient material such as plastic, cork, rubber or the like, are arranged as shown, and then with the tubular sleeve 25 within the body members 14, it will be seen that the bolts 20 can be extended through the registering apertures 19 and then the nuts 21 are tightened on the bolts in order to bring the flanges 18 towards each other. As the flanges 18 are clamped together, the rings 23 will be tightly clamped or urged into engagement with the pipes 10 and also the rings 23 will have their grooves 24 snugly engaged by the beveled ends 26 of the tubular sleeve 25 so that a tight seal or joint is provided which will insure that there will be no leakage of fluid or other medium which is passing through the pipes. When the coupling is no longer needed, the nut 21 can be readily removed so that the coupling can be disconnected from the pipes and used over and over again.

The parts can be made of any suitable material and in different shapes or sizes.

The pipes may be of a type which are used for conveying various types of substances, as for example steam may be conveyed through the pipes from a member 11 to a member or structure 12, and when steam or other material is being conveyed the coupling 13 will insure that there will be no leakage of the steam or other material at the joint or connection betweent the pipes. With the present invention it is not necessary to weld the body members 14 together since the bolts 20 and nuts 21 serve to fasten these parts in their proper position. The members can be made in any suitable manner, as for example on a punch press, or else certain of the parts can be molded or machined as desired. The coupling can be quickly clamped in place and it is only necessary to insert the bolts through the registering apertures 19 and then arrange the nuts 21 thereon so that the entire job of coupling the pipes together is greatly speeded up or simplified. The coupling will withstand high pressures, as for example when high pressure steam is passing through the lines or pipes. The tighter the nuts 21 are arranged on the bolts 20, the tighter the packing or rings 23 will become on the pipes so as to make the coupling tighter on the pipes. The parts cannot blow apart or accidentally become separated and slippage will also be avoided. In addition, the openings 17 are slightly larger in diameter than the pipes 10 and the sleeve 25 is slightly larger in diameter than the pipes 10 so that these parts can expand and contract slightly as for example when substances of hot or cold temperatures are passing through the pipes in order to permit expansion or contraction without breakage of any of the various elements. The circular ridge or rib 22 helps prevent bending or buckling of the flanges 18 and also permits the flanges 18 to be made of thinner material and the ribs 22 will thus act as stabilizers or stiffeners. The rings 23 tightly engage the pipes so as to insure that there will be no leakage of material as for example when high pressure steam is being conveyed from one location to another. The coupling can be used on pipes through which is passing various substances such as steam, water, gasoline, or the like. The number of bolts 20 can be varied as desired.

Minor changes in shape, size and rearrangement of details coming within the field of invention claimed may be resorted to in actual practice, if desired.

What is claimed is:

A coupling for a pair of smooth non-threaded pipes that are arranged in end to end non abutting relation with respect to each other, said coupling embodying a pair of similar opposed body members which each include a hollow cylindrical portion that is provided with an inwardly directed circular shoulder on one end thereof, the cylindrical portions being at least as long as the outside diameter of the pipes, said shoulder having a central opening for the projection therethrough of a portion of the pipe, said opening being smooth and free of threads, outwardly directed circular flanges on the adjacent inner ends of the cylindrical portions, the inner opposed surfaces of said flanges being smooth and flat, the flanges of said body members being arranged in parallel contiguous relation with respect to each other, said flanges being provided with registering apertures, securing elements engaging said apertures for connecting said flanges together, said securing elements constituting the sole means of fastening the body members together, compressible fluid sealing rings positioned in the cylindrical portions of the body members and said compressible rings abutting said shoulders, a tubular cylindrical sleeve surrounding the adjacent end portions of said pipes and said sleeve being positioned within said cylindrical portions, said sleeve being of a length approximately twice the length of one cylindrical portion minus the approximate length of one sealing ring whereby on assembly of the parts, the flanges will not abut, the inner diameters of said cylindrical portions being sufficiently larger than the outer diameter of the sleeve so that the cylindrical portions can move back and forth on the sleeve to permit adjustment of the body members toward and away from each other as the securing elements are tightened or loosened, end portions of said sleeve extending into the space between the cylindrical portions of the body members and the pipes, said sealing rings being radially thicker than the wall thickness of said sleeve, said sleeve being of uniform diameter throughout its length and being free of shoulders, the ends of said sleeve being beveled, there being annular grooves in the ends of the compressible sealing rings for engaging the beveled ends of the sleeve, circular ribs on the outer peripheral portions of the flanges, said ribs helping to prevent bending and buckling of the flanges and also permitting the flanges to be made of thin material, and the ribs acting as stabilizers and stiffeners, said ribs being of equal diameter, said ribs circumscribing circles which surround the apertures in the flanges, the ends of the securing elements projecting outwardly beyond the outer portions of the ribs, the openings in the shoulders being slightly larger than the outside diameter of the pipes, the openings in said shoulders being small enough to prevent said rings from extending therethrough, said compressible rings being of a size so as to snugly engage said pipes, said sleeve having an inside diameter which is slightly larger than the outside diameter of the pipes on which said sleeve is mounted, the above recited proportions of the sleeve, shoulder, and cylindrical portions permitting axial elongation and contraction of the pipes while preventing substantial axial misalignment thereof.

References Cited in the file of this patent

UNITED STATES PATENTS

| | | |
|---|---|---|
| 223,835 | Boyle | Jan. 27, 1880 |
| 663,879 | Gallup | Dec. 18, 1900 |
| 817,300 | David | Apr. 10, 1906 |
| 1,535,294 | Collins | Apr. 28, 1925 |
| 2,138,135 | Boucher | Nov. 29, 1938 |
| 2,148,863 | Key | Feb. 28, 1939 |
| 2,162,184 | Snyder | June 13, 1939 |
| 2,247,163 | Bradley | June 24, 1941 |
| 2,269,695 | Scharf | Jan. 13, 1942 |
| 2,475,057 | Shaber | July 5, 1949 |
| 2,699,344 | Bissell | Jan. 11, 1955 |
| 2,832,615 | Summers | Apr. 29, 1958 |

FOREIGN PATENTS

| | | |
|---|---|---|
| 522,224 | Italy | Mar. 31, 1955 |
| 522,582 | Italy | Apr. 8, 1955 |